United States Patent [19]

Krauchick

[11] Patent Number: 4,588,148

[45] Date of Patent: May 13, 1986

[54] HELICOPTER RESCUE DEVICE

[76] Inventor: Walter Krauchick, 28 Humphrey St., Seymour, Conn. 06483

[21] Appl. No.: 616,904

[22] Filed: Jun. 4, 1984

[51] Int. Cl.[4] .......................... A62B 1/02; B64D 9/00

[52] U.S. Cl. .......................... 244/137 P; 244/17.11; 182/63

[58] Field of Search ............. 244/17.11, 137 R, 137 P, 244/138 R, 118.5; 182/63, 137, 138; 441/83; 14/71.5

[56] References Cited

U.S. PATENT DOCUMENTS

| | | | |
|---|---|---|---|
| 2,738,939 | 3/1956 | Johnson | 244/137 P |
| 3,065,934 | 11/1962 | Jackson | 244/137 R |
| 3,931,868 | 1/1976 | Smith, Jr. | 182/63 |
| 4,011,615 | 3/1977 | Makson et al. | 14/71.5 |
| 4,188,000 | 2/1980 | Dalziel | 244/137 P |

FOREIGN PATENT DOCUMENTS

| | | | |
|---|---|---|---|
| 1535289 | 6/1968 | France | 244/137 P |
| 2387051 | 12/1978 | France | 244/137 P |

OTHER PUBLICATIONS

Westland Aircraft Ltd, advertisement, *Flight,* Jan. 18, 1957, p. 13.

*Primary Examiner*—Trygve M. Blix
*Assistant Examiner*—Rodney Corl
*Attorney, Agent, or Firm*—Lawrence Hager

[57] ABSTRACT

A helicopter rescue device having a catwalk cantilevered outwardly from the front end of the helicopter. A plurality of upright stanchions are provided along each side of the catwalk with one or more safety cables attached between the spaced stanchions to form a pair of spaced safety guardrails each disposed longitudinally along a respective side of the catwalk. A pair of support cables are affixed between the helicopter and an intermediate section of the catwalk support beams. One or more grasping hooks or anchoring means may be provided at the cantilevered free end of the catwalk to enable anchoring to building ledges and window sills.

11 Claims, 5 Drawing Figures

HELICOPTER RESCUE DEVICE

FIELD OF THE INVENTION

This invention relates to airborne rescue devices and more particularly to a helicopter rescue device.

BACKGROUND OF THE INVENTION

Various types of helicopter rescue devices have hitherto been proposed such as a net mounted to arms extending from the underside of a helicopter, as is described in U.S. Pat. No. 4,188,000 issued Feb. 12, 1980 to David G. Dalziel.

Another prior art rescue device is shown in U.S. Pat. No. 3,931,868 issued Jan. 13, 1976 to C. P. Smith, Jr. This patent describes a gondola supported by a helicopter in which the gondola is stabilized with respect to the exterior wall of a building so that people trapped within the building can be removed and lowered to the ground.

Yet another prior art rescue device is shown in U.S. Pat. No. 3,934,847 issued Jan. 29, 1976 to P. Bentivegna, which describes a helicopter having a fuselage with a floor that has an opening therethrough. A rescue capsule is operably connected to the helicopter by cable and winches.

Other prior art patents of interest include: U.S. Pat. Nos: 4,113,207 issued Sept. 12, 1978 to David G. Dalziel; 2,738,939 issued Mar. 20, 1956 to F. M. Johnson; 2,942,816 issued June 28, 1960 to P. E. Dostie; 2,953,330 issued Sept. 20, 1960 to Lysak; 3,072,371 issued Jan. 8, 1963 to Doyle; and French Pat. No. 2,387,051.

The above noted patents are mentioned as being representative of the prior art and other pertinent references may exist. None of these patents are deemed to affect the patentability of the present claimed invention.

In contrast to the prior art, the present invention provides a platform extended outwardly from the front of the helicopter to enable successive persons to walk or crawl from a (burning) structure directly into a door or hatchway at the front of the helicopter. Anchoring means may be provided to enable the free end of the platform to be rested on or hooked over, for example, a window sill. An accordian type of canopy may also be provided to shield the escaping persons from the helicopter's down drafts and any flames escaping from the structure.

SUMMARY OF THE INVENTION

Generally speaking, in accordance with the invention, a helicopter rescue attachment device is provided having particular utility for facilitating safer and more expeditious rescue/removal of personnel from a structure such as a burning building, comprising:

a platform (10) extendable outwardly from a front portion (13) of the helicopter (11) with one end (22) being aligned with and in proximity to a front helicopter hatchway (36) to enable personnel egress therebetween, the other end of said platform being extended beyond the forward reach of the main rotor blade(s) of the helicopter and having securing end means (27) to enable contact with and stabilization on a ledge or window sill like structure; and a pair of spaced guardrails (30) each disposed longitudinally along a respective side of the platform.

Another feature of the invention comprises the use of a canopy or cover means (51) to shield any personnel on the platform from the helicopter's down drafts and, for example, from flames which may be about the structure from which the rescue operation is being conducted.

Accordingly, it is an object of the present invention to provide apparatus readily attachable to a helicopter for facilitating personnel rescue missions.

Another object of the present invention is to provide a relatively inexpensive apparatus for rescuing one or more persons from an elevated location such as from an upper level window of a burning building.

Another object of the present invention is to provide an air rescue device which permits persons to be rescued to walk or crawl on a platform suspended by a helicopter from the building in which they are situated and into a hatchway located in the front of the helicopter.

Yet another object of the present invention is to provide a helicopter adapted with a device extendable from beneath the front fuselage outwardly beyond the main rotor blade reach to enable persons to traverse thereon to facilitate safer and more expeditious rescue of a plurality of persons into a front fuselage hatchway.

BRIEF DESCRIPTION OF THE DRAWINGS

Other objects and advantages of the invention may be more clearly seen when viewed in conjunction with the accompanying drawings. Similar reference numerals refer to similar parts throughout.

DESCRIPTION OF THE PREFERRED EMBODIMENT

Figure 1:
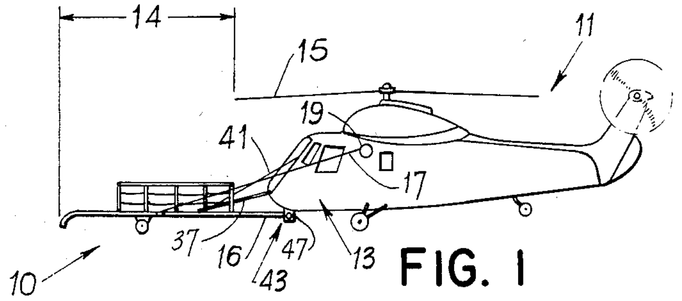
FIG. 1 is a side elevational view of the helicopter and rescue platform in accordance with the invention.

Referring to the drawings, particularly FIG. 1, there is shown a rescue platform 10 and helicopter 11 constructed in accordance with the invention such that a walkway 12 extends outwardly from the front fuselage 13 of helicopter 11 a predetermined distance 14 beyond the length of the main rotor blade 15 when rotated to a frontal disposition as illustrated. Rescue platform 10 has a frame like construction and, preferrably, is formed of lightweight metal such as aluminum, titanium or magnesium to withstand a loading capacity, for example, of approximately two thousand pounds or more and also to be capable of withstanding severe jarring.

Figure 4:
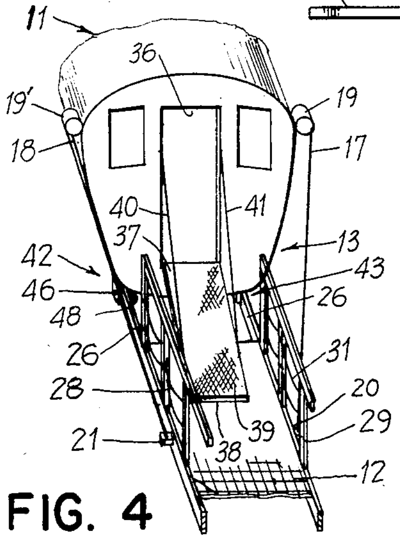
FIG. 4 is a cutaway perspective view of the front hatchway and rescue platform attached to the helicopter mounting brackets.

Rescue platform 10 is affixable at one end 16 to the helicopter fuselage 13 by means of anchor plates and bolts (see FIG. 4). A pair of suspension cables 17 and 18 are each affixed at one end to a respective securing clamp or winch means 19 (only one shown) projecting from a respective side of the fuselage 13. The other end of suspension cables 17 and 18 are affixed to cable securing clamps 20 and 21, respectively, diametrically disposed on the frame member 22 of rescue platform 10. Suspension cables 17 and 18 have a predetermined length such that walkway 12 is typically held in a horizontal orientation for personnel to walk or crawl thereon during a rescue mission. It should bs recognized, however, that cables 17 and 18 may be suspended from a winch means of conventional design to selectively vary the length of cables 17 and 18 and, thereby, the walkway 12 slope relative to the horizontal axis of helicopter 11.

Figure 2:
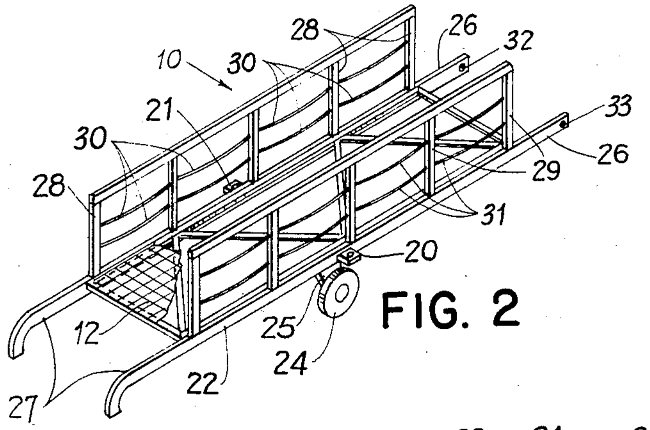
FIG. 2 is a perspective view of the rescue platform in accordance with the invention.
Figure 3:
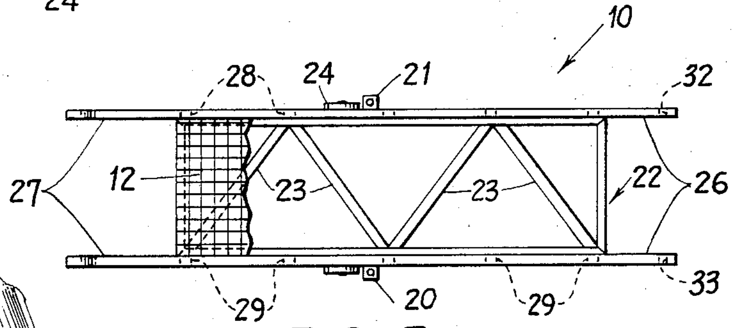
FIG. 3 is a top view, partly cutaway, of the rescue platform.

With reference now to FIGS. 2 and 3 the structure of rescue platform 10 will now be discussed in more detail. Rescue platform 10 generally comprises a lightweight frame member 22 of rectangular shape, a plurality of support cross bars or members 23, a catwalk or walking platform (shown partly cutaway) 12 affixed across the length of frame member 22, a pair of cable securing clamps 20 and 21, a pair of rear arms 26, a pair of front arms 27, a plurality of upright stanchions 28 and 29 on each side of frame member 22, and a plurality of guard rails or safety cables 30 and 31 interconnected between the stanchions 28 and 29, respectively, on a side of the rescue platform 10. Each of said rear arms 26 have a bolt or pin receiving hole 32 and 33 formed therein for receiving a respective mounting bolt or pin (see FIG. 4). Front arms 27 may be bent downwardly or have a hook like shape to facilitate securing or stabilizing the rescue platform 10 on a ledge or window sill (not shown). A pair of wheels 24 may be mounted to frame member 22 by any conventional means such as bracket 25.

The frame member 22 and cross bars 23 may be constructed of tubular or other suitable shaped metal members and welded or bolted together. The catwalk 12 may comprise a perforated or heavy gauge screen-like metal platform or a solid metal sheet welded to the frame member 22 and/or cross bars 23. Catwalk 12 should be capable of withstanding the weight of several people or more at one time being on the rescue platform 10.

Stanchions 28 and 29 should be substantially rigid to provide support for cables 30 and 31, respectively, and thereby form spaced apart lateral guardrails extending substantially the entire length of frame member 22. Stanchions 28, 29 and cables 30, 31 should be formed of suitable material to withstand the weight and bumping forces of one or more persons traversing platform 10.

With reference now to FIG. 4, there is shown a partial perspective view of helicopter 11 which has been adapted for receiving rescue platform 10 in accordance with the invention. The front fuselage 13 is provided with a hatchway 36 opening into the helicopter 11 having suitable dimensions to enable egress of personnel. Preferably, the hatchway door 37 opens outwardly such that its free edge 38 abuts or is in juxtaposition with catwalk 12 and has a surface 39 to provide sure footing. Door 37 may have a pair of support lines 40 and 41 to facilitate raising and lowering door 37 to provide guardrails to persons entering and exiting helicopter 11.

Two pairs of anchor plates 42 and 43 are affixed in conventional manner, for example bolted or welded, to the support structure of helicopter 11. Each pair of anchor plates 42 and 43 have a hole 44 and 45, for receiving a bolt or mounting pin 46 and 47, respectively, therein.

Rescue platform 10 is mounted to helicopter 11 by inserting each end of arms 26 between a set of anchor plates 42 and 43 such that holes 32 and 33 align with holes 44 and 45, respectively. Bolts 46 and 47 are then inserted into holes 32, 44 and 33,45, respectively; and nuts or cotter pins 48 and 49 are affixed to bolts 46 and 47, respectively, to secure the rescue platform 10 to helicopter 11. Next cables 17 and 18 are attached to clamps 20 and 21, respectively, and to clamps 19 and 19', respectively.

Wheels 24 may be provided, as noted above, to facilitate moving the rescue platform 10 about on the ground for readily mounting and dismounting platform 10 with helicopter 11 as the need occurs.

Figure 5:
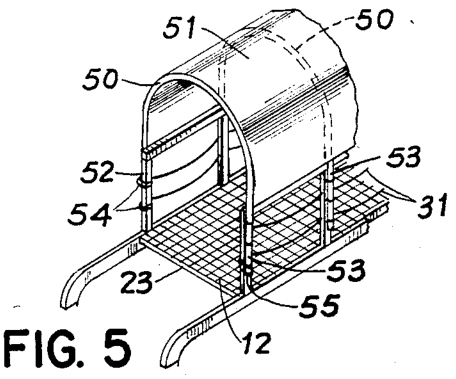
FIG. 5 is a perspective view of the canopy.

With reference to FIG. 5, an alternative embodiment of the invention shown in FIGS. 1-4 is illustrated. The rescue platform 10 and helicopter 11 of this embodiment is similar to that shown in FIGS. 1-4, with the exception that the rescue platform 10 has a canopy affixed thereto to substantially shield the traversing individuals from down drafts of the helicopter 11 and from flames or debris from the structure from which the persons are being rescued. Each rib 50 of canopy 51 has a pair of downwardly projecting beams 52 and 53 which are mounted within mounting brackets 54 and 55, respectively, for supporting the canopy in position as illustrated. Bolts or other conventional fastening means may also be utilized to further secure the canopy to the rescue platform 10. As noted above, the canopy may be of the accordian type to facilitate ground storage, and preferably should be of a fire proof material. It should also be recognized that a counterbalance device of conventional design, for example, as described in U.S. Pat. No. 4,188,000, which is incorporated herein to the extent necessary, may be utilized if desired to counterbalance rescue platform 10.

While there has been shown what is considered to be the preferred embodiments of the invention, it is desired to secure in the appended claims all modifications as fall within the true spirit and scope of the invention.

I claim:

1. An air rescue attachment device for a helicopter having a frontal passageway, comprising:
   - support means having a first and a second pair of anchor plates each affixed to the underside of the helicopter and a pair of support cables each affixed at one end to a respective upper side portion of the helicopter, said first pair of anchor plates are spaced apart and have a coaxial mounting bolt receiving hole, said second pair of anchor plates are spaced apart and have a coaxial mounting bolt receiving hole; and
   - platform means for supporting one or more traversing persons and being mountable to said support means with a first portion substantially in proximity to the frontal passageway to enable egress therebetween, said platform means having a predetermined length with a second portion extending outwardly from the helicopter a distance greater than the helicopter rotor blade rotational projection beyond the front fuselage to enable juxtapositioning of said end portion with a structure with said helicopter and platform means being airborne.

2. An air rescue attachment device as in claim 1, wherein:
   - the platform means includes a pair of spaced guardrails each disposed longitudinally along a respective side of the platform means.

3. An air rescue attachment device as in claim 2, wherein:
   - the guardrails comprise a plurality of upright rigid stanchions with one or more safety cables attached between the spaced stanchions to form the pair of spaced apart safety guardrails each disposed longitudinally along a respective side of the platform means.

4. An air rescue attachment device as in claim 1, wherein:

the second portion includes means for being secured to the structure to stabilize said second portion in abutment to the structure to facilitate egress between the structure and said platform means.

5. An air rescue attachment device as in claim 4, wherein:

the securing means comprises a pair of rigid arms each having a curved end portion configured for being hooked on or over a window sill like opening or ledge portion of the structure.

6. An air rescue attachment device as in claim 1, wherein:

the platform means includes a first and a second spaced apart rear arm means each having a bolt receiving hole and a pair of cable securing clamp means each on a respective side of said platform means, said first rear arm means configured for being inserted between said first pair of anchor plates with each bolt receiving hole being laterally aligned for receiving a first mounting bolt means therethrough, said second rear arm means configured for being inserted between said second pair of anchor plates with each bolt receiving hole being laterally aligned for receiving a second mounting bolt means therethrough; and each of said pair of support cables having its other end affixed to a respective one of said pair of cable securing clamp means.

7. An air rescue attachment device as in claim 6, wherein:

the pair of support cables each have a predetermined length to suspend said platform means from the helicopter substantially to an angle of inclination with respect to the helicopter.

8. An air rescue attachment device as in claim 2, wherein:

the helicopter includes a door means for the frontal passageway being hinge mounted at its bottom portion for being outwardly opened such that its upper portion being disposable in juxtaposition with said platform means and between said spaced guardrails.

9. An air rescue attachment device as in claim 1, wherein:

the platform means includes a canopy extending longitudinally over a substantial portion of said platform means.

10. An air rescue device, comprising:

a helicopter having a rrontal passageway opening in its fuselage extending into an interior passenger compartment, said opening having a door means mounted to enable outwardly opening said door means with an upper portion of said door means being positionable to a lowered disposition, said door means having a walkway surface and a pair of spaced guardrails extending between said door means and said fuselage, said helicopter having a first pair of spaced substantially parallel anchor plate means affixed to the underside and to one side portion of the helicopter with each anchor plate having a mounting bolt or pin receiving hole, a second pair of spaced substantially parallel anchor plate means affixed to the underside and to the other side portion of the helicopter with each anchor plate having a mounting bolt or pin receiving hole, and having a first and a second cable clamp means each affixed to a respective upper side of said helicopter;

platform means having a walkway for supporting at least one traversing person, and having a first and a second rear arm means each having a bolt receiving hole and being adapted for being received between and bolted to said first and second pair of anchor plates respectively with a first and a second bolt means, and having a third and a fourth cable clamp means each affixed on a respective side of said platform means, and having a first plurality of upright stanchions with one or more safety lines attached therebetween to form a guardrail along a longitudinal side of said platform means, and having a second plurality of upright stanchions with one or more safety lines attached therebetween to form a guardrail along the other longitudinal side of said platform means, and having one or more front arm means securable to a building window sill or ledge;

a first securing cable means affixed between said first and third cable clamp means; and a second securing cable means affixed between said second and fourth cable clamp means.

11. An air rescue device as in claim 10, including:

a wheel assembly means affixed or affixable to said platform means to facilitate ground handling thereof; and a fire proof canopy means for covering said platform means to substantially shield persons on said platform means from the helicopter down drafts.

* * * * *